(12) United States Patent
Hezemans et al.

(10) Patent No.: US 7,773,466 B2
(45) Date of Patent: Aug. 10, 2010

(54) DISK TRAY MECHANISM FOR REPRODUCING APPARATUS

(75) Inventors: Cornelius Antonius Hezemans, Eindhoven (NL); Hendrikus Albertus Looijmans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1011 days.

(21) Appl. No.: 10/544,193

(22) PCT Filed: Jan. 30, 2004

(86) PCT No.: PCT/IB2004/000302
§ 371 (c)(1), (2), (4) Date: Aug. 2, 2005

(87) PCT Pub. No.: WO2004/070719
PCT Pub. Date: Aug. 19, 2004

(65) Prior Publication Data
US 2006/0133238 A1    Jun. 22, 2006

(30) Foreign Application Priority Data
Feb. 6, 2003    (EP) .................................. 03100252

(51) Int. Cl.
*G11B 21/08* (2006.01)
(52) U.S. Cl. .................................................. 369/30.27
(58) Field of Classification Search ........................ None
See application file for complete search history.

(56) References Cited

U.S. PATENT DOCUMENTS

| | | | |
|---|---|---|---|
| 5,838,515 A * | 11/1998 | Mortazavi et al. ........ | 360/78.12 |
| 6,034,499 A * | 3/2000 | Tranovich .................. | 318/650 |
| 6,373,650 B1 | 4/2002 | Pedrazzini | |
| 6,388,832 B1 | 5/2002 | Dobbek et al. | |
| 6,434,087 B1 * | 8/2002 | Schell et al. ............. | 369/13.02 |
| 2001/0019526 A1 * | 9/2001 | Takeda ....................... | 369/75.2 |
| 2002/0044520 A1 * | 4/2002 | Kabasawa .................. | 369/77.2 |
| 2003/0053381 A1 * | 3/2003 | Takahashi et al. ......... | 369/30.24 |
| 2003/0174617 A1 * | 9/2003 | Kim et al. ................. | 369/53.22 |
| 2004/0066712 A1 * | 4/2004 | Mitsumoto et al. ....... | 369/30.36 |

(Continued)

FOREIGN PATENT DOCUMENTS

JP    62088167    4/1987

(Continued)

*Primary Examiner*—Joseph H Feild
*Assistant Examiner*—Henok G Heyi

(57) ABSTRACT

The invention relates to a tray mechanism consisting of sliding means comprising an electrical tray motor, for moving a tray—provided for containing a disc (for example an optical disc) on which information is recorded—from a projected position, for the placement of the disc or its discharge, to a contained one, for the reproduction of recorded information, or reciprocally, and a drive power source, for supplying an applied voltage to said tray motor. Control means supply different values of the voltage applied to the tray motor according to different mechanical functions controlled by said motor. According to the invention, it is provided, for the tray steering, a motor current feed-forward loop comprising a first direct branch, itself comprising in series a first amplifier of the input voltage applied to the loop, the tray motor and a resistor, and a second branch, itself comprising in series a second amplifier and an adder, which receives on one input the input voltage applied to the loop and on the other one the output of said second amplifier.

2 Claims, 2 Drawing Sheets

U.S. PATENT DOCUMENTS

2005/0204373 A1 * 9/2005 Ueno et al. .................. 720/616

FOREIGN PATENT DOCUMENTS

| JP | 02096972 | | 9/1990 |
| JP | 04071382 | A | 3/1992 |
| JP | 2000014180 | A | 1/2000 |
| JP | 2000339821 | A | 12/2000 |

* cited by examiner

DISK TRAY MECHANISM FOR REPRODUCING APPARATUS

FIELD OF THE INVENTION

The present invention first relates to a tray mechanism consisting of sliding means comprising an electrical tray motor, for moving a tray—provided for containing an optical disc on which information is recorded—from a projected position, for the placement of the disc or its discharge, to a contained one, for the reproduction of recorded information, or reciprocally, and a drive power source, for supplying an applied voltage to said tray motor, said sliding means also including control means for supplying different values of the voltage applied to the tray motor according to different mechanical functions controlled by said motor.

The invention also relates to a reproducing apparatus comprising an apparatus body, pickup means for optically picking up recorded information from a disc and a tray mechanism for sliding said disc, with respect to said apparatus body, either to a projected position, for the placement of the disc or its discharge, or to a contained position, for the reproduction of recorded information, said tray mechanism consisting of sliding means comprising an electrical tray motor and a drive power source for supplying an applied voltage to said tray motor, said sliding means also including control means for supplying different values of the voltage applied to the tray motor according to different mechanical functions controlled by said motor.

The invention is for instance applicable in a CD or DVD drive, this application being however not a limitation of the scope of the invention.

BACKGROUND OF THE INVENTION

A commonly used mechanism for loading a disc in a disc drive is that of a tray mechanism: the tray is either in an "OUT" position, in which the disc can be placed on it or taken out, or in an "IN" position, in which the disc is loaded in the drive and can be pushed out or pulled back by an electrical direct current motor. For moving the tray out or in, a voltage is applied to the motor for a specified amount of time. During this time, this voltage can have different values at different moments, first to create a smooth motion of the tray, and also because the tray motor has to control other mechanical functions of loading or unloading the disc (for example an extra force is needed when the magnetic clamper has to release the disc).

With the applied voltages, the tray must move out and in within a specified time. It is then important that the electrical and mechanical specifications of the tray mechanism are known within small tolerances and do not change during its lifetime. If the specifications do not meet the applied voltages, this would result in a too fast or too slow tray movement. In worst case situations, the tray could even not move at all, for example when the friction of the tray has increased because of contamination.

SUMMARY OF THE INVENTION

It is a first object of the invention to improve the performance of the DC tray motor, so that the specifications of the tray mechanism better meet the voltages applied to the motor.

To this end, the invention relates to a tray mechanism as defined in the introductory part of the description and which is moreover characterized in that said sliding, means includes a motor current feed-forward loop comprising the following elements:

a first direct branch, itself comprising in series a first amplifier of the input voltage applied to the loop, the tray motor and a resistor;

a second branch, the input of which is connected between the output of the tray motor and the input of the resistor that is not connected to the earth, said second branch itself comprising in series a second amplifier and an adder, and said adder receiving on one input the input voltage applied to the loop and on the other one the output of said second amplifier.

The document U.S. Pat. No. 6,373,650 describes a linear motor control circuit used for moving according to several operating modes the read/write heads of memory disc drives. The driver circuit of the linear motor includes a non-linear feedback circuit, and this circuit comprises a sense amplifier, followed first by a ramping amplifier, and then by a feedback amplifier. The ramping amplifier is either connected in series with the sense amplifier in a first head parking/unparking mode of operation, for modifying the signals from the sense amplifier, or bypassed in the other modes. The feedback amplifier is connected either to the output of said ramping amplifier in the first mode or to the output of said sense amplifier in the other modes and switched to provide either a first predetermined gain in said first mode or another predetermined one in the other modes. The selective connection of the ramping amplifier according to the operating mode allows to change the sign of the feedback and therefore to drive the motor as a function of either a positive or a negative feedback signal. With respect to that solution, the technical one according to the present invention is however much simpler and allows to achieve a linear and closer control of the speed of the motor.

It is another object of the invention to propose a reproducing apparatus (for instance an optical disc reproducing apparatus) in which such a mechanism is provided.

To this end, the invention relates to a reproducing apparatus as defined in the introductory part of the description and which is moreover characterized in that the sliding means include a motor current feed-forward loop comprising the following elements:

a first direct branch, itself comprising in series a first amplifier of the input voltage applied to the loop, the tray motor and a resistor;

a second branch, the input of which is connected between the output of the tray motor and the input of the resistor that is not connected to the earth, said second branch itself comprising in series a second amplifier and an adder, and said adder receiving on one input the input voltage applied to the loop and on the other one the output of said second amplifier.

With respect to an open loop steering of the motor, it appears that, with the technical solution according to the invention, the velocity of the motor is less dependent of friction (that can differ from one mechanism to the other and generally increases during lifetime because of contamination). Moreover, said velocity, based on a measured or specified motor constant of the tray motor, can be controlled quite accurately and is more independent from other parameters. The velocity being better controlled, a much smoother opening and closing of the tray is possible, no overcompensation of the voltage is needed to handle tolerances of the tray mechanism, and a better timing is possible, for example for reducing the velocity of the tray when it is about to hit an end stop.

BRIEF DESCRIPTION OF THE DRAWINGS

The invention will now be described, by way of example only, in a more detailed manner and with reference to the accompanying drawings, in which.

DETAILED DESCRIPTION OF THE INVENTION

Figure 1:
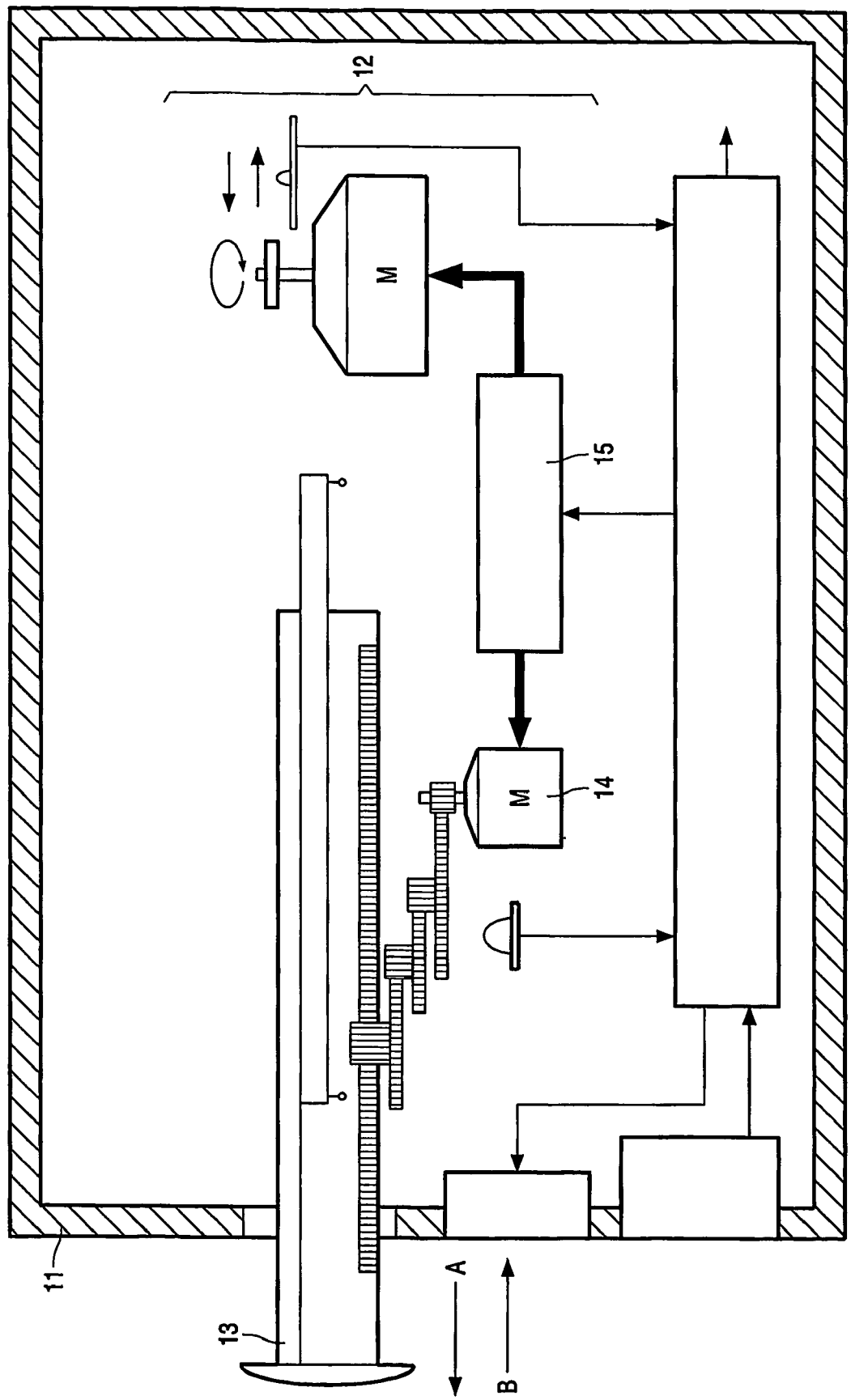
FIG. 1 illustrates the main elements of an apparatus for reproducing recorded information.

As shown in FIG. 1, an apparatus for reproducing information recorded on a disc, for example an optical disc, usually comprises the main following elements: an apparatus body 11, pickup means 12 for optically picking, up recorded information from an optical disc rotated by a motor (not referenced) and a tray mechanism 13 for moving a tray containing said disc either to a so-called projected position A (with respect to said apparatus body 11), for the placement of the disc in view of the reproduction of recorded information or its discharge when said reproduction is brought to its end, or to a so-called contained position B, in which the reproduction operation can be carried out. The tray mechanism 13 itself consists of sliding means mainly composed of an electrical tray motor 14 and a drive power source 15 for supplying an applied voltage to the tray motor 14, said sliding means also including control means for supplying different values of the voltage applied to the tray motor according to different mechanical functions selectively controlled by said motor at different moments (for example, an extra force is needed when the disc has to be released).

Figure 2:
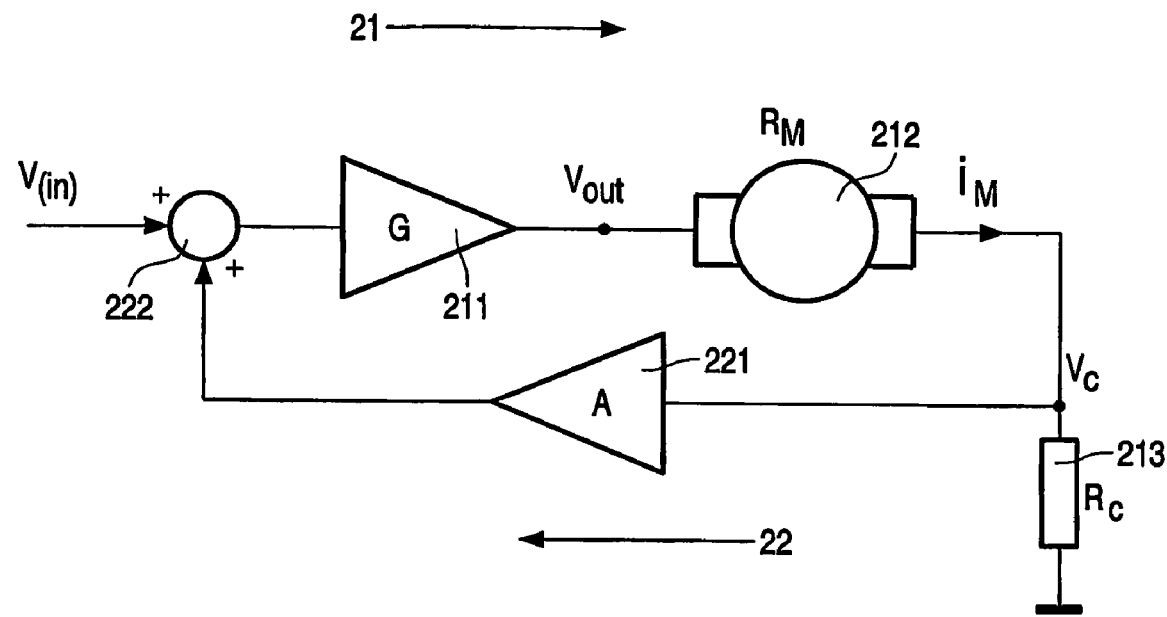
FIG. 2 shows the motor current feed-forward principle according to the invention.

According to the invention, it is proposed to provide in the sliding means, for the tray steering, a current feed-forward loop. The diagram of FIG. 2 shows the principle of such a motor current feed-forward loop, which includes a direct branch 21 and a feedback branch 22. The branch 21 successively comprises an amplifier 211 (reference G in FIG. 1), a tray motor 212 and a resistor 213 (reference $R_c$). The branch 22, the input of which is connected between the output of the tray motor and the input of the resistor 213 not connected to the earth, successively comprises an amplifier 221 (reference A) and an adder 222. The adder 222 receives on one input the input voltage V(in) applied to the loop and on the other input the output of the amplifier 221 and its output is connected to the input of the amplifier 211.

Figure 3:
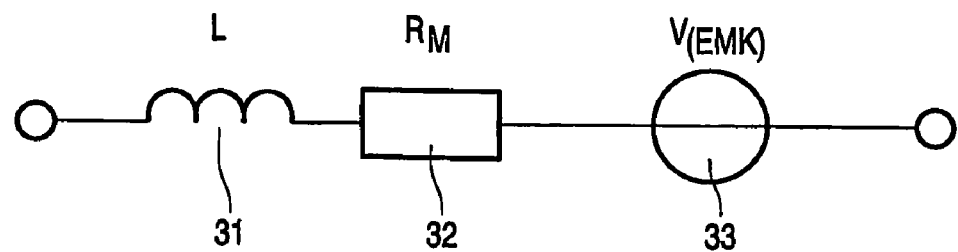
FIG. 3 shows the model used for the tray motor.

For the tray motor, a very simple model is used. As shown in FIG. 3, said model contains a self-inductance 31 of the coils, an internal resistance 32 ($R_M$) and a voltage source 33 $V_{(EMK)}$ that represents the back electromotive force generated by the coil of the motor. This model can even be simplified by assuming that the signals applied to the motor are of relatively low frequencies (in this situation, the influence of the self-inductance of the coils can be ignored) and that the voltage $V_{(EMK)}$ of the voltage source 33 is a quasi-static signal that is proportional to the angular velocity of the motor.

From these assumptions, in order to show what influence the current feed-forward loop has on the behaviour of the motor in relation to the voltage applied to the system, the loop transfer can be calculated. The output voltage of the motor driver equals:

$$V(\text{out}) = G \cdot (V(\text{in}) + A \cdot V(C)) \quad (1)$$

with:
G=gain of the amplifier 211;
V(in)=input voltage applied to the loop;
A=gain of the amplifier 221;
V(C)=voltage at the output of the resistor 213 not connected to the earth.

The expression (1) also be written:

$$V(\text{out}) = G \cdot (V(\text{in}) + A \cdot i(M) \cdot R_c) \quad (2)$$

with i(M)=current through the resistor 213 ($R_c$), or:

$$V(\text{out}) = i(M) \cdot (R_c) + R(M)) + V_{(EMK)} \quad (3)$$

By combining the expressions (2) and (3), one gets the following expression:

$$i(M) \cdot (R(C) + R(M)) + V_{(EMK)} = G \cdot (V(\text{in}) + A \cdot i(M) \cdot R_c) \quad (4)$$

which can also be written in the form:

$$G \cdot V(\text{in}) = V_{(EMK)} + i(M) \cdot (R_c + R(M)) - G \cdot A \cdot i(M) \cdot R_c \quad (5)$$

So, if the gain is chosen in the feed-forward loop with the value:

$$A = (R_c + R(M)/(G \cdot R_c) \quad (6)$$

Then the expression (5) becomes:

$$G \cdot V(\text{in}) = V_{(EMK)} \quad (7)$$

In this expression (7), it can be seen that the feed-forward loop acts as a negative resistance that compensates for the motor resistance $R_M$. As said above, the back electromotive force $V_{(EMK)}$ of the motor is proportional to the angular velocity of the motor. So, from the expression (7), it can be concluded that by choosing the correct feed-forward gain, the tray motor can be forced to have an angular velocity that is proportional to the input voltage V(C).

In practice, the effect of the feed-forward is slightly reduced because of the fact that the gain cannot be set exactly to the calculated value. Tolerances in the system and changing characteristics because of aging could indeed result in a gain that is higher than the calculated optimum, which may result in a less stable loop. When working with a fixed gain, the gain has therefore to be chosen conservatively low (a more complex method would be using the current measurement for measuring the characteristics of the loop and, based on this measurement, selecting the gain more accurately, which improves the performance of the feed-forward loop).

It has been shown that the loop structure according to the invention results in a tray motor behaviour that comes close to a velocity controlled steering and has the advantages indicated hereinabove.

The invention claimed is:
1. A tray mechanism consisting of:
sliding means comprising an electrical tray motor, for moving a tray either to a projected position, for the placement of a disc or its discharge, or to a contained position, for the reproduction of recorded information, and
a drive power source, for supplying an applied voltage to said tray motor,
said sliding means also including control means for supplying different values of the voltage applied to the tray motor according to different mechanical functions controlled by said motor, wherein said sliding means includes, for the tray steering, a motor current feed-forward loop comprising the following elements:

a first direct branch, comprising in series a first amplifier of the input voltage applied to the loop, the tray motor and a resistor; and a second branch, the input of which is connected between the output of the tray motor and the input of the resistor that is not connected to ground, said second branch comprising in series a second amplifier and an adder, and said adder receiving on one input the input voltage applied to the loop and on the other one the output of said second amplifier, wherein gain of the feed-forward loop is chosen such that an angular velocity of the tray motor is proportional to the input voltage applied to the loop for the tray steering.

2. A disc reproducing apparatus comprising:

an apparatus body, pickup means for picking up recorded information from a disc and a tray mechanism for sliding said disc, with respect to said apparatus body, either to a projected position, for the placement of the disc or its discharge, or to a contained position, for the reproduction of recorded information, said tray mechanism consisting of sliding means comprising:

an electrical tray motor and a drive power source for supplying an applied voltage to said tray motor, said sliding means also including control means for supplying different values of the voltage applied to the tray motor according to different mechanical functions controlled by said motor at different moments, wherein said sliding means includes, for the tray steering, a motor current feed-forward loop comprising the following elements:

a first direct branch, comprising in series a first amplifier of the input voltage applied to the loop, the tray motor and a resistor; and a second branch, the input of which is connected between the output of the tray motor and the input of the resistor that is not connected to ground, said second branch comprising in series a second amplifier and an adder, and said adder receiving on one input the input voltage applied to the loop and on the other one the output of said second amplifier, wherein gain of the feed-forward loop is chosen such that an angular velocity of the tray motor is proportional to the input voltage applied to the loop for the tray steering.

* * * * *